US012059865B2

(12) United States Patent
Prager et al.

(10) Patent No.: US 12,059,865 B2
(45) Date of Patent: Aug. 13, 2024

(54) PRODUCTION OF PAPER STICKS

(71) Applicant: SETTER GMBH & CO. PAPIERVERAR-BEITUNG, Emmerich (DE)

(72) Inventors: Robert Prager, Emmerich am Rhein-Elten (DE); Leo Wins, Emmerich am Rhein (DE); Roland Hülkenberg, Emmerich am Rhein (DE)

(73) Assignee: SETTER GMBH & CO. PAPIERVERARBEITUNG, Emmerich (DE)

( * ) Notice: Subject to any disclaimer, the term of this patent is extended or adjusted under 35 U.S.C. 154(b) by 0 days.

(21) Appl. No.: 17/638,069

(22) PCT Filed: Aug. 26, 2020

(86) PCT No.: PCT/EP2020/073866

§ 371 (c)(1),
(2) Date: Feb. 24, 2022

(87) PCT Pub. No.: WO2021/037920

PCT Pub. Date: Mar. 4, 2021

(65) Prior Publication Data

US 2022/0314570 A1 Oct. 6, 2022

(30) Foreign Application Priority Data

Aug. 27, 2019 (DE) ..................... 20 2019 003 550.8

(51) Int. Cl.

| | |
|---|---|
| ***B31D 5/00*** | (2017.01) |
| ***B31F 1/00*** | (2006.01) |
| ***B65H 19/12*** | (2006.01) |
| ***B65H 35/04*** | (2006.01) |

(Continued)

(52) U.S. Cl.

CPC .......... *B31D 5/0091* (2013.01); *B31F 1/0025* (2013.01); *B65H 19/12* (2013.01);

(Continued)

(58) Field of Classification Search

CPC ..... B31D 5/0091; B31F 1/0025; B65H 19/12; B65H 35/04; B65H 37/07; F26B 3/04; F26B 17/22

(Continued)

(56) References Cited

U.S. PATENT DOCUMENTS

| | | | | |
|---|---|---|---|---|
| 2,699,098 A * | 1/1955 | Lyons | .................. | B31D 5/0091 53/216 |
| 3,155,016 A * | 11/1964 | Pellicone | ............ | B31D 5/0091 493/305 |

(Continued)

FOREIGN PATENT DOCUMENTS

| | | |
|---|---|---|
| CN | 19747221 A | 5/2019 |
| DE | 202017102548 U1 | 5/2017 |
| GB | 2070575 A | 9/1981 |

OTHER PUBLICATIONS

Int'l. Search Report from corresponding Int'l. Application No. PCT/EP2020/073866, Mar. 15, 2021.

*Primary Examiner* — Lucas E. A. Palmer
(74) *Attorney, Agent, or Firm* — UB Greensfelder LLP; Brian E. Turung

(57) ABSTRACT

The invention relates to paper processing, namely the processing of a paper web or a paper web section in order to form a paper stick. The processing is carried out in multiple process stages, including storing the paper web, stretching the paper web, controlling/regulating the guide for the lateral edge, conveying the paper web, folding the paper web, rolling, adding an additive, cutting, removing the remaining paper web, separating the paper sticks, drying the sticks, and/or post-treating the sticks.

39 Claims, 2 Drawing Sheets

(51) Int. Cl.
*B65H 37/06* (2006.01)
*F26B 3/04* (2006.01)
*F26B 17/22* (2006.01)

(52) U.S. Cl.
CPC ............. *B65H 35/04* (2013.01); *B65H 37/06* (2013.01); *F26B 3/04* (2013.01); *F26B 17/22* (2013.01); *B31D 2205/00* (2013.01)

(58) Field of Classification Search
USPC .......................................................... 492/340
See application file for complete search history.

(56) References Cited

U.S. PATENT DOCUMENTS

| | | | | | |
|---|---|---|---|---|---|
| 3,452,650 | A * | 7/1969 | Cobb | B31D 5/0091 | 493/464 |
| 4,083,741 | A * | 4/1978 | Goldberg | A61K 9/2072 | 156/278 |
| 4,721,504 | A * | 1/1988 | Cogswell | B65H 45/22 | 493/441 |
| 5,039,003 | A * | 8/1991 | Gordon | B65D 5/6626 | 229/148 |
| 5,619,806 | A * | 4/1997 | Warren | F26B 13/105 | 162/290 |
| 2011/0203520 | A1* | 8/2011 | Fusejima | B01J 2/14 | 118/500 |
| 2016/0082751 | A1* | 3/2016 | Zhang | B41J 11/04 | 225/93 |
| 2019/0017224 | A1* | 1/2019 | Beck | D21H 27/02 | |
| 2019/0257581 | A1* | 8/2019 | Wray | F26B 1/005 | |
| 2020/0407915 | A1* | 12/2020 | Kurosaki | D21F 9/00 | |

* cited by examiner

PRODUCTION OF PAPER STICKS

The present application claims priority on International Application Serial No. PCT/EP2020/073866 filed Aug. 26, 2020, which in turn claims priority on German Application Serial No. 20 2019 003 550.8 filed Aug. 29, 2019.

FIELD OF THE INVENTION

The invention relates to a paper supply receiving device for receiving and/or providing a paper supply, in particular comprising a paper roll, in particular for a paper processing device for the processing of a paper web section to form multiple paper sticks.

The invention also relates to a web tensioning control device for the tensioning of a paper web originating from a paper supply, in particular for a paper processing device for the processing of a paper web section to form multiple paper sticks.

The invention also relates to a lateral edge controlling device for the controlled moving of a paper web originating from a paper supply, in particular for a paper processing device for the processing of a paper web section to form multiple paper sticks.

The invention also relates to a high speed paper web conveying arrangement for conveying a paper web originating from a paper supply, in particular for a paper processing device for the processing of a paper web section to form multiple paper sticks.

The invention also relates to a paper web conveying- and folding device for conveying a paper web section originating from a paper supply and for arranging a surface change, corresponding to a fold, at least of one region of a paper web section, in particular for a paper processing device for the processing of a paper web section to form multiple paper sticks.

The invention also relates to a rolling arrangement for the rolling of a paper web section removed from a paper supply to form an almost cylindrical paper body, in particular for a paper processing device for the processing of a paper web section to form multiple paper sticks.

The invention also relates to an additive adding device for the feeding of an additive in the processing of a paper web section to form multiple paper sticks, in particular for a paper processing device for the processing of a paper web section to form multiple paper sticks.

The invention also relates to a cutting arrangement for the cutting of a paper body, in particular for a paper processing device for the processing of a paper web section to form multiple paper sticks formed form a paper body.

The invention also relates to a disposal device for the disposing of paper web residues, formed for instance by one or more cutting devices, in particular for a paper processing device for the processing of a paper web section to form multiple paper sticks.

The invention also relates to a sorting device, which is formed in particular in a multi-stage manner, for the sorting of paper sticks, in particular for a paper processing device for the processing of a paper web section to form multiple paper sticks.

The invention also relates to a drying device for the drying of paper sticks which are in particular moistened by an additive, in particular for a paper processing device for the processing of a paper web section to form multiple paper sticks.

The invention also relates to a post-treatment drum for the post-treatment of paper sticks, in particular for a paper processing device for the processing of a paper web section to form multiple paper sticks.

The invention also relates to a paper processing device for the processing of a paper web section to form multiple paper sticks.

The invention also relates to a method for producing paper sticks.

TECHNOLOGICAL BACKGROUND

The producing of paper sticks is known from U.S. Pat. No. 2,357,846 B. The further processing of paper sticks manufactured accordingly is problematic because particular further processing requirements are accordingly not able to be fulfilled.

PRESENTATION OF THE INVENTION

To solve the problem, according to which paper sticks for the further processing of the sticks to form products having paper sticks, for instance cotton swabs or lollipops are to be manufactured quickly and in large quantities in a multi-stage manufacturing process so that particular technical further processing requirements are to be fulfilled in a reproducible manner, and that the process stages are to be coordinated with one another, the invention proposes a paper supply receiving device.

Further processing requirements include characteristics such as dimensional stability, flexural rigidity, dimensions and further requirements. The requirements vary according to the further processing measure. If a cotton swab is to be formed from a paper stick by further processing, then requirements for cotton sticks apply; if a lollipop is to be made from a paper stick, then requirements for lollipops apply. Further requirements relate to production rate, production costs, colour, lettering, labelling, etc.

The paper supply receiving device serves for the receiving and/or providing of a paper supply, comprising in particular a paper roll. The paper supply receiving device can be a component of a paper processing device for the processing of a paper web section to form multiple paper sticks. The paper supply is able to be actuated by means of a pneumatic clamping device which is able to be arranged on a frame. The web width of the paper supply is preferably approximately 350 mm or more than approximately 350 mm, in particular more than approximately 350 mm and less than approximately 700 mm, preferably more than approximately 350 mm and less than approximately 500 mm. The paper roll can have a net weight of approximately 600 kg, in particular a net weight of between approximately 300 kg and approximately 700 kg. For the exchanging of a used-up paper supply for a new paper supply, i.e., for changing a paper web roll, fastening- and exchanging means such as a tool or a pin or a change-over shaft are dispensable and are not provided as equipment.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a web tensioning control device for the tensioning of a paper web originating from a paper supply, which is of independent inventive significance.

The web tensioning control device can be a component of a paper processing device for the processing of a paper web section to form multiple paper sticks. The web width of the paper supply is approximately 350 mm or more than approximately 350 mm, in particular more than approximately 350 mm and less than approximately 700 mm, preferably more than approximately 350 mm and less than approximately 500 mm.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a lateral edge controlling device for the controlled moving of a paper web originating from a paper supply, which is of independent inventive significance. The lateral edge controlling device can be a component of a paper processing device for the processing of a paper web section to form multiple paper sticks. The paper web has a first and a second lateral edge, wherein the web width of the paper supply is approximately 350 mm or more than approximately 350 mm, in particular more than approximately 350 mm and less than approximately 700 mm, preferably more than approximately 350 mm and less than approximately 500 mm.

To solve the above-mentioned problem, according to which in particular paper sticks for the further processing of the sticks to form products having paper sticks, for instance cotton swabs or lollipops, are to be manufactured in large quantities, wherein particular technical further processing requirements are to be fulfilled in a reproducible manner, the invention proposes a high speed paper web conveying arrangement for the conveying of a paper web, originating from a paper supply, which is of independent inventive significance. The high speed paper web conveying arrangement can be a component of a paper processing device for the processing of a paper web section to form multiple paper sticks. More than approximately 3,000 paper sticks are able to be produced per minute, in particular between approximately 3,000 sticks and 6,000 sticks per minute, preferably approximately 10,000 sticks per minute. Nominal diameter tolerances in the region of 1/100 mm are able to be achieved per stick with a diameter of less than approximately 4 mm. Nominal length tolerances in the region of approximately 1/10 mm are able to be achieved per stick with a length of less than approximately 100 mm. A transverse cutting of the paper web of the paper supply can take place by means of a perforating blade device, which perforates the paper web substantially perpendicularly to the paper web conveying device, and which crosscuts the perforated paper web by means of a crosscutting roller, wherein the crosscutting roller rotates at a crosscutting roller speed. The crosscutting roller can have a profiled surface.

To solve the above-mentioned problem, according to which in particular paper sticks for the further processing of the sticks to form products having paper sticks, for instance cotton swabs or lollipops, are to be manufactured quickly and in large quantities, wherein particular technical further processing requirements are to be fulfilled in a reproducible manner, the invention proposes a paper web conveying- and folding device for the conveying of a paper web section originating from a paper supply and for the arranging of a surface change, corresponding to a fold, at least of one region of the paper web section, which is of independent inventive significance. The paper web conveying- and folding device can be a component of a paper processing device for the processing of a paper web section to form multiple paper sticks. The paper web conveying- and folding device comprises a first conveying roll and a second conveying roll arranged substantially parallel to the first conveying roll, and a folding roll arranged adjacent to or between the first and second conveying roll, by which a paper web section of the paper web supply is folded in certain places so that the paper web section, which is running almost flat, has a fold protruding from the conveying plane. The paper web conveying- and folding device comprises at least one further, i.e., a fourth or a fourth and a fifth, conveying roll.

Each conveying roll can be rotatably arranged in a high speed conveying roll bearing, by which more than approximately 3,000 paper sticks can be successfully manufactured per minute, in particular between approximately 3,000 sticks and approximately 6,000 sticks per minute, preferably approximately 10,000 sticks per minute. The folding roll can be formed as a profile roller. At least one conveying roll can be formed as a counter-roller of the folding roll/profile roller, which is at least partially in mechanical contact with the folding roll/profile roller. At least one conveying roll of the paper web conveying- and folding device, preferably a counter-roller acting on a folding roll formed as a profile roller, can have a cross-section, in particular a conically running profile, changing over the length of the conveying roll, in particular with 2 mm diameter change over the roll length. At least one conveying roll of the paper web conveying- and folding device, preferably a counter-roller, lying adjacent to a folding roll formed as a profile roller, can have a coating, preferably a coating which comprises a plastic or textile material.

To solve the above-mentioned problem, according to which in particular paper sticks for the further processing of the sticks to form products having paper sticks, for instance cotton swabs or lollipops, are to be manufactured quickly and in large quantities, wherein particular technical further processing requirements are to be fulfilled in a reproducible manner, the invention proposes a rolling arrangement for the rolling of a paper web section removed from a paper supply to form an almost cylindrical paper body, which is of independent inventive significance. The rolling arrangement can be a component of a paper processing device for the processing of a paper web section to form multiple paper sticks. The rolling arrangement comprises a rotatable roller, in particular formed as a drum, able to be arranged on a frame, and a cover, able to be fastened in a static manner, able to be arranged on a frame at a predetermined distance from the roller, so that a roller space is formed between roller and cover, in which a paper web which is cut to length and acted upon with a fold, is able to be formed to a thin, substantially cylindrical paper body, consequently able to be rolled. The cover is arranged above the roller.

The paper web can thus describe a path upwards, against the force of gravity, in particular a path with at least partially radial geometry. After the cutting to length of the paper strip or respectively paper web section, for instance from a paper roll, the web section is transported away on a circular path upwards, therefore against the force of gravity. After cutting off, the paper runs upwards on a circular path.

The roller can have a roller diameter of approximately 1,000 mm, preferably a roller diameter in a roller diameter range of more than approximately 700 mm and less than approximately 1,500 mm. The cover of the rolling arrangement can have a cover geometry which comprises a main radius which is greater by half the width of the rolling space than the roll diameter, and which comprises at least one sector, preferably several sectors, with a sector radius deviating from the main radius, so that the width of the rolling space in the region of the sector deviates from the remaining width of the rolling space in the region of the sector, and/or so that the width of the rolling space varies over the circumference of the roller, in particular varies substantially continuously. The predetermined diameter of the substantially cylindrical paper body which is to be formed can be formed in a diameter sector of the rolling space which, in relation to the paper web conveying direction, is arranged at the end of the rolling space, and which takes up substantially approximately a quarter of the rolling space. The surface of the roller delimiting the rolling space, and/or the surface of the cover delimiting the rolling space, can comprise at least one coating, preferably a coating which comprises plastic and/or textile.

To solve the above-mentioned problem, according to which in particular paper sticks for the further processing of the sticks are to be manufactured quickly and in large quantities to form products having paper sticks, for instance cotton swabs or lollipops, wherein particular technical further processing requirements are to be fulfilled in a reproducible manner, the invention proposes an additive adding device for the feeding of an additive in the processing of a paper web section to form multiple paper sticks, which is of independent inventive significance. The additive adding device can be a component of a paper processing device for the processing of a paper web section to form multiple paper sticks. The additive adding device assigns the additive to a component of the paper processing device, in particular to a region of a roller of a rolling arrangement, preferably to a region of a roller of a rolling arrangement arranged at the bottom, in particular opposite a cover. The additive can comprise water or can be formed from water. The additive adding can take place by means of a rotor application system.

The applying of the additive in the rolling arrangement (5), in particular onto a rotating roller (8) of the rolling arrangement (5), can take place before a paper web section (6) is processed in the rolling arrangement (5). In this respect, the adding of additive onto the rotating drum or respectively roller takes place before the introducing of the paper (web) section into the compression- and winding process, which takes place in the rolling arrangement (see above).

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a cutting arrangement for cutting a paper body, which is of independent inventive significance. The cutting arrangement can be a component of a paper processing device for processing a paper web section to form multiple paper sticks formed from a paper body. The cutting arrangement comprises at least one, preferably several, blades, wherein the at least one, in particular each, blade is able to be positioned and/or able to be moved, and/or is able to be adjusted with regard to position and/or movement, and/or able to be controlled and/or able to be regulated. The cutting arrangement can form an assembly which, with respect to the conveying direction of the paper web, is arranged at or behind a rolling arrangement, preferably in the end-side region of the rolling space.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a disposal device for the disposing of paper web residues, formed for instance by one or more cutting devices, which is of independent inventive significance. The disposal device can be a component of a paper processing device for the processing of a paper web section to form multiple paper sticks. The disposal device is arranged beneath a frame or machine stand of the paper-processing device.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a sorting device, which in particular is formed in a multi-stage manner, for the sorting of paper sticks, which is of independent inventive significance. The sorting device can be a component of a paper processing device for the processing of a paper web section to form multiple paper sticks. At least one trough conveyor is provided, which comprises at least one trough, preferably several troughs, and which is able to be acted upon at least partially by at least one oscillation, so that paper sticks and/or paper body waste are able to be spatially separated, and/or so that the manufactured paper sticks are able to be handled adjustably with regard to orientation, position to one another and conveying speed. The geometry of the trough or troughs can be adaptable to the dimensions and conveying characteristics of the manufactured paper sticks. An oscillating sorting box can be provided in which the aligned manufactured paper sticks are able to be sorted for a subsequent further processing and/or packing. A transfer device can be provided for transferring the sorted paper sticks to an external device, in particular to a conveyor belt.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a drying device for the drying of paper sticks, in particular moistened by an additive, which is of independent inventive significance. The drying device can be a component of a paper processing device for the processing of a paper web section to form several paper sticks. The drying takes place preferably after the paper stick forming, wherein the drying device comprises a spiral conveyor, which is able to be acted upon with warmed ambient air by means of a blower device, and wherein the operation of the spiral conveyor and blower device is in particular adjustable, in particular able to be controlled and/or regulated.

The conveying of the paper sticks in the drying device takes place preferably along a radially winding conveying section, in particular with a conveying section length. The windings of the conveying section have a conveying section diameter. The conveying section comprises a height difference, i.e., the paper sticks are conveyed upwards in the drying device. The ratio of height difference/conveying section diameter can be at least approximately 2, preferably between approximately 2 and approximately 3, particularly preferably it can be greater than approximately 2. Hereby, the spiral conveyor has a high and slim design.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a post-treatment drum for the post-treatment of paper sticks according, which is of independent inventive significance. The post-treatment drum can be a component of a paper processing device for the processing of a paper web section to form multiple paper sticks. The post-treatment drum is rotatable, wherein the post-treatment drum is suitable to coat paper sticks, and wherein the post-treatment drum has a drum geometry adapted to the conveying- and movement characteristics of the manufactured paper sticks, in particular with a polygonal, in particular hexagonal, drum cross-section.

The drum can have at least one opening on at least one end face, i.e., laterally, preferably on both end faces, preferably respectively an opening extending substantially over the entire area of the end face(s). Accordingly, for the possible applying of an additive for post-treatment onto the (dried) paper sticks and, in particular, rotating drum, opened at both (lateral) ends, can be used.

To solve the above-mentioned problem, according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a paper processing device for the processing of a paper web section to form multiple paper sticks, which is of independent inventive significance. The paper processing device according to the invention comprises a paper supply receiving device, described herein, and/or a web tensioning control device described herein and/or a lateral edge controlling device described herein and/or a high speed paper web conveying arrangement described herein and/or a paper web conveying- and folding device described herein and/or a rolling arrangement described herein and/or an additive adding device described herein and/or a cutting arrangement described herein and/or a disposal device described herein and/or a sorting device described herein and/or a drying device described herein and/or a post-treatment drum described herein.

To solve the above-mentioned problem according to which in particular paper sticks are to be manufactured quickly and in large quantities for the further processing of the sticks to form products having paper sticks, for instance cotton swabs or lollipops, wherein particular technical further processing requirements are to be fulfilled in a reproducible manner, the invention proposes a method for producing paper sticks, which is of independent inventive significance. In the method, one or more measures are implemented according to a paper processing device described herein, in particular a receiving of paper supply, and/or a controlling of web tensioning, and/or a controlling of lateral edges, and/or a conveying and folding of paper web, and/or a rolling, and/or an adding of additive, and/or a cutting, and/or a disposal, and/or a sorting, and/or a drying, and/or a post-treatment.

The components mentioned above and described in the example embodiments, to be used according to the invention are not subject to any particular exception conditions with regard to their size, shaping, material selection and technical design, so that the selection criteria which are known in the field of application can be used unrestrictedly.

In summary, the invention relates to a paper supply receiving device (3) for receiving and/or providing a paper supply (2), comprising a paper roll (2), for a paper processing device (1) for the processing of a paper web section (6) to form multiple paper sticks, wherein the paper supply (2) is able to be actuated by means of a pneumatic clamping device, able to be arranged on a frame, wherein for exchanging a used-up paper supply (2) for a new paper supply (2), i.e., for changing a paper web roll (2), fastening- and exchanging means, such as a tool or a pin or a change-over shaft are dispensable and not provided as equipment, and wherein the paper roll (2) has optionally a net weight of approximately 600 kg, and optionally a net weight of between approximately 300 kg and approximately 700 kg.

The invention also relates to a web tensioning control device for the tensioning of a paper web (4) originating from a paper supply (2), for a paper processing device (1) for the processing of a paper web section (6) to form multiple paper sticks, wherein the web width of the paper supply (2) is approximately 350 mm or more than approximately 350 mm, optionally more than approximately 350 mm and less than approximately 700 mm, and optionally more than approximately 350 mm and less than approximately 500 mm.

The invention also relates to a lateral edge controlling device for the controlled moving of a paper web (4) originating from a paper supply (2), optionally for a paper processing device (1) for the processing of a paper web section (6) to form multiple paper sticks, wherein the paper web (4) has a first and a second lateral edge, wherein the web width of the paper supply (2) is approximately 350 mm or more than approximately 350 mm, optionally more than approximately 350 mm and less than approximately 700 mm, and optionally more than approximately 350 mm and less than approximately 500 mm.

The invention also relates to a high speed paper web conveying arrangement for the conveying of a paper web (4) originating from a paper supply (2), for a paper processing device (1) for the processing of a paper web section (6) to form multiple paper sticks, wherein per minute more than approximately 3,000 paper sticks are able to be produced, optionally per minute between approximately 3,000 sticks and approximately 6,000 sticks, and optionally per minute approximately 10,000 sticks, wherein a transverse cutting of the paper web (4) of the paper supply (2) takes place by means of a perforating blade device, which perforates the paper web (4) substantially perpendicularly to the paper web conveying direction, and which cuts the perforated paper web (4) to length by means of a crosscutting roller, wherein the crosscutting roller rotates with a crosscutting roller speed, and wherein the crosscutting roller has a profiled surface.

The invention also relates to a paper web conveying- and folding device (19) for the conveying of a paper web section (6) originating from a paper supply (2), and for the arranging of a surface change, corresponding to a fold, at least of one region of the paper web section (6), for a paper processing device (1) for the processing of a paper web section (6) to form multiple paper sticks, wherein the paper web conveying- and folding device (19) comprises a first conveying roll and a second conveying roll arranged substantially parallel to the first conveying roll, and a folding roll arranged adjacent to or between the first and second conveying roll, with which a paper web section (6) of the paper web supply (2) is folded in certain places so that the paper web section (6), which is running almost flat, has a fold protruding from the conveying plane, and wherein the paper web conveying- and folding device (19) comprises at least one further, i.e., a fourth or a fourth and a fifth, conveying roll. The folding roll is optionally formed as a profile roller and wherein optionally at least one conveying roll is formed as a counter-roller of the folding roll/profile roller, which is at least partially in mechanical contact with the folding roll/profile roller. At least one conveying roll of the paper web conveying- and folding device (19), and optionally a counter-roller acting on a folding roll formed as a profile roller, optionally has a cross-section changing over the length of the conveying roll, optionally a conically running profile, optionally with up to approximately 2 mm diameter change over the roll length. At least one conveying roll of the paper web conveying- and folding device (19), optionally a counter-roller lying against a folding roll formed as a profile roller, optionally has a coating, and optionally a coating which comprises a plastic or textile material.

The invention also relates to a rolling arrangement (5) for the rolling of a paper web section (6) removed from a paper supply (2), to form an almost cylindrical paper body, for a paper processing device (1) for the processing of a paper web section (6) to form multiple paper sticks, wherein the rolling arrangement (5) comprises a rotatable roller (8), optionally formed as a drum (8), able to be arranged on a frame, and a cover (9), able to be fastened statically, able to be arranged on a frame at a predetermined distance from the roller (8), so that between roller (8) and cover (9) a rolling space (10) is formed in which a paper web (4), which is cut to length and is acted upon with a fold, is able to be shaped to form a thin, substantially cylindrical paper body, namely is able to be rolled, and wherein the cover (9) is arranged above the roller (8). The paper web (4) optionally describes a path upwards against the force of gravity, optionally a path with at least partially radial geometry. The roller (8) optionally has a roller diameter of approximately 1,000 mm, and optionally a roller diameter in a roller diameter range of more than approximately 700 mm and less than approximately 1,500 mm. The cover (9) of the rolling arrangement (5) optionally has a cover geometry which comprises a main radius which is greater by half the width of the rolling space (10) than the roller diameter, and which comprises at least one sector, and optionally several sectors, with a sector radius deviating from the main radius, so that the width of the rolling space (10) deviates in the region of the sector from the remaining width of the rolling space (10), and/or so that the width of the rolling space (10) varies over the circumference of the roller (8), optionally varies substantially continuously. The predetermined diameter of the substantially cylindrical paper body which is to be formed is optionally formed in a diameter sector of the rolling space (10) which, in relation to the paper web conveying direction, is arranged at the end of the rolling space (10), and which takes up substantially approximately a quarter of the rolling space (10). The surface of the roller (8) delimiting the rolling space (10) and/or the surface of the cover (9) delimiting the rolling space (10) optionally comprises at least one coating, and optionally a coating which comprises plastic and/or textile.

The invention also relates to an additive adding device (11) for the feeding of an additive in the processing of a paper web section (6) to form multiple paper sticks, for a paper processing device (1) for the processing of a paper web section (6) to form multiple paper sticks, wherein the additive adding device (11) assigns the additive to a component of the paper processing device (1), optionally to a region of a roller (8) of a rolling arrangement (5), optionally to a region (12) of a roller (8) of a rolling arrangement (5) arranged at the bottom, optionally opposite a cover (9). The applying of the additive in the rolling arrangement (5), optionally to a rotating roller (8) of the rolling arrangement (5), optionally takes place before a paper web section (6) is processed in the rolling arrangement (5). The additive optionally comprises water or is formed from water. The adding of additive optionally takes place by means of a rotor application system.

The invention also relates to a cutting arrangement (13) for cutting a paper body, for a paper processing device (1) for the processing of a paper web section (6) to form multiple paper sticks formed from a paper body, with at least one, and optionally several, blades, wherein the at least one, optionally each, blade is able to be positioned and/or movable and/or adjustable with regard to position and/or movement, and/or able to be controlled and/or able to be regulated, and wherein the cutting arrangement (13) forms an assembly which, in relation to the conveying direction of the paper web (4), is arranged at or behind a rolling arrangement (5), and optionally in the end-side region of the rolling space (10).

The invention also relates to a disposal device (14) for disposing of paper web residues, formed for instance by one or more cutting arrangements (13), for paper processing device (1) for the processing of a paper web section (6) to form multiple paper sticks, wherein the disposal device (14) is arranged beneath a frame or machine stand of the paper processing device (1).

The invention also relates to a sorting device (15), which is formed optionally in a multi-stage manner, for the sorting of paper sticks, for a paper processing device (1) for the processing of a paper web section (6) to form multiple paper sticks, wherein at least one trough conveyor is provided, which comprises at least one trough, and optionally several troughs, and which is able to be acted upon at least partially by at least one oscillation, so that paper sticks and/or paper body waste are able to be spatially separated, and/or so that the manufactured paper sticks are able to be handled adjustably with regard to orientation, position with respect to one another, and conveying speed. The geometry of the trough or troughs is optionally able to be adapted to the dimensions and conveying characteristics of the manufactured paper sticks. An oscillating sorting box (16) is optionally provided, in which the aligned manufactured paper sticks are able to be sorted for a subsequent further processing and/or packing.

The invention also relates to a drying device (17) for the drying of paper sticks, optionally moistened by an additive, for a paper processing device (1) for the processing of a paper web section (6) to form multiple paper sticks, wherein the drying takes place optionally after the paper stick forming, wherein the drying device (17) comprises a spiral conveyor which is able to be acted upon with warmed ambient air by means of a blower device, and wherein the operation of the spiral conveyor and blower device is optionally adjustable, optionally is able to be controlled and/or regulated. The conveying of the paper sticks optionally takes place along a radially winding conveying section, optionally with a conveying section length, wherein the windings of the conveying section have a conveying section diameter, wherein the conveying section comprises a height difference, and wherein the radio of height difference/conveying section diameter is at least approximately 2, and optionally between approximately 2 and approximately 3, and optionally greater than approximately 2.

The invention also relates to a post-treatment drum (18) for the post-treatment of paper sticks, for a paper processing device (1) for the processing of a paper web section (6) to form multiple paper sticks, wherein the post-treatment drum (18) is rotatable, wherein the post-treatment drum (18) is suitable for coating paper sticks, and wherein the post-treatment drum (18) has a drum geometry adapted to the conveying- and movement characteristics of the manufactured paper sticks, optionally with a polygonal, optionally hexagonal, drum cross-section. On at least one end face, and optionally on both end daces, the drum optionally has at least one opening, and optionally respectively an opening extending substantially over the entire area of the end face(s).

The invention also relates to a paper processing device (1) for the processing of a paper web section (6) to form multiple paper sticks, wherein a paper supply receiving device (3) is provided as discussed above, and/or wherein a web tensioning control device is provided as discussed above, and/or wherein a lateral edge controlling device is provided as discussed above, and/or wherein a high speed paper web conveying arrangement is provided as discussed above, and/or wherein a paper web conveying- and folding device (19) as discussed above is provided, and/or wherein a rolling arrangement (5) is provided as discussed above, and/or wherein an additive adding device (11) as discussed above, and/or wherein a cutting arrangement (13) as discussed above is provided, and/or wherein a disposal device (14) as discussed above is provided, and/or wherein a sorting device (15) as discussed above is provided, and/or wherein a drying device (17) as discussed above is provided, and/or wherein a post-treatment drum (18) as discussed above is provided.

The invention also relates to a method for producing paper sticks, in which one or more measures are implemented according to a paper processing device as discussed above, optionally a receiving of paper supply, and/or a controlling of web tensioning, an/or a lateral edge controlling and/or a paper web conveying and folding, and/or a rolling, and/or an adding of additive, and/or a cutting, and/or a disposal, and/or a sorting, and/or a drying, and/or a post-treatment.

Further details, features and advantages of the subject of the invention will emerge from the following description and the associated drawings, in which—by way of example—an example embodiment of a paper processing device is illustrated. Individual features of the embodiments can also be combined with other features of other embodiments.

BRIEF DESCRIPTION OF THE FIGURES

In the drawings there are shown

DETAILED DESCRIPTION OF EXAMPLE EMBODIMENTS

Figure 1:
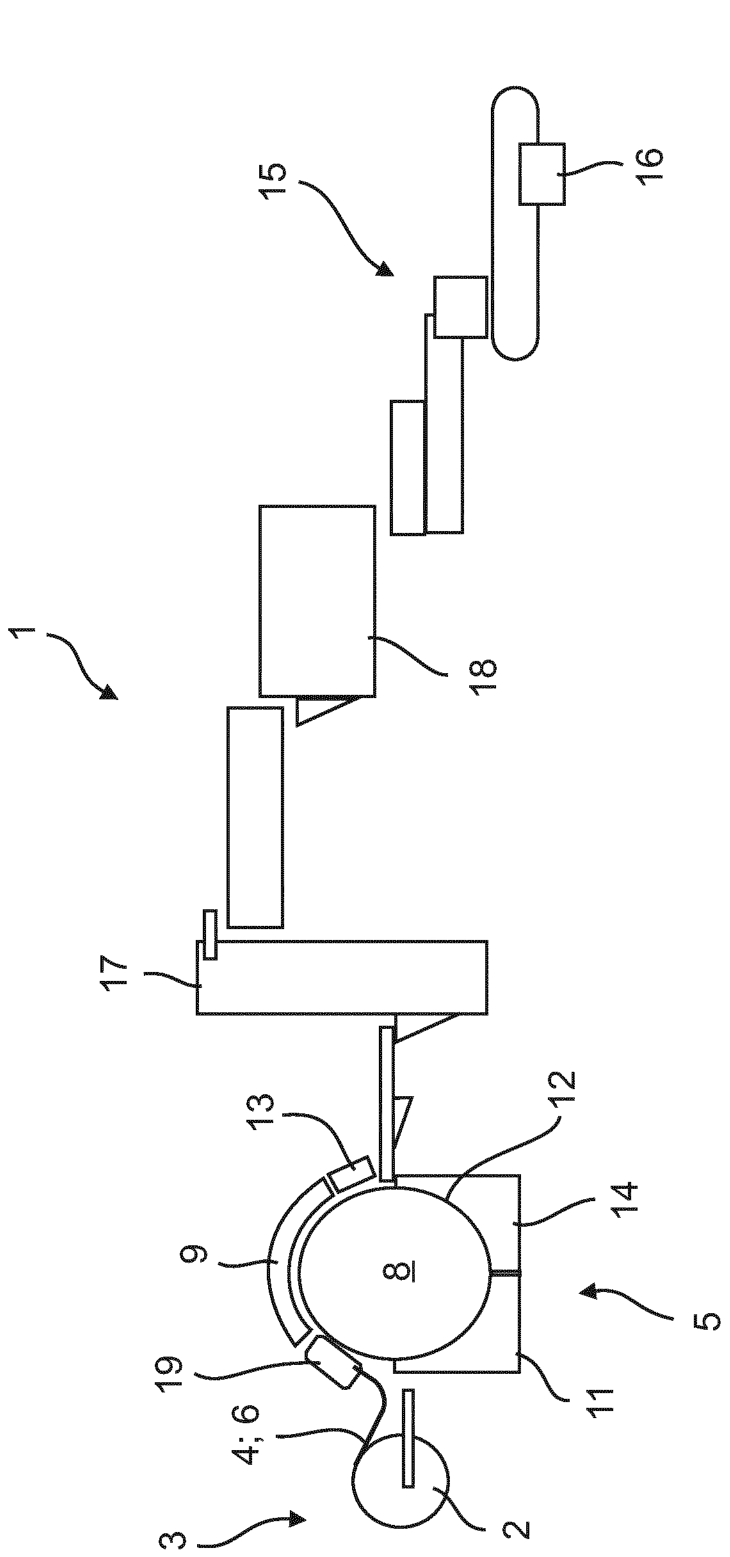
FIG. 1 a paper processing device in schematic lateral view.

A schematic illustration of a paper processing device 1 can be seen from FIG. 1. The paper processing device 1 comprises several paper processing stations. Paper processing measures take place in each of the stations.

A paper supply 2 is arranged in a paper supply receiving device 3. The paper supply 2 is formed as a paper roll 2. The paper roll 2 can have a net weight of 600 kg. The paper roll 2 can also be heavier or lighter. The paper roll 2 is arranged and fastened in the paper supply receiving device 3 without a pin or other tools; rather, it is clamped there pneumatically or hydraulically. A paper web 4 can be unrolled from the paper roll 2. The paper web 4 has a width of preferably more than 350 mm.

Figure 2:
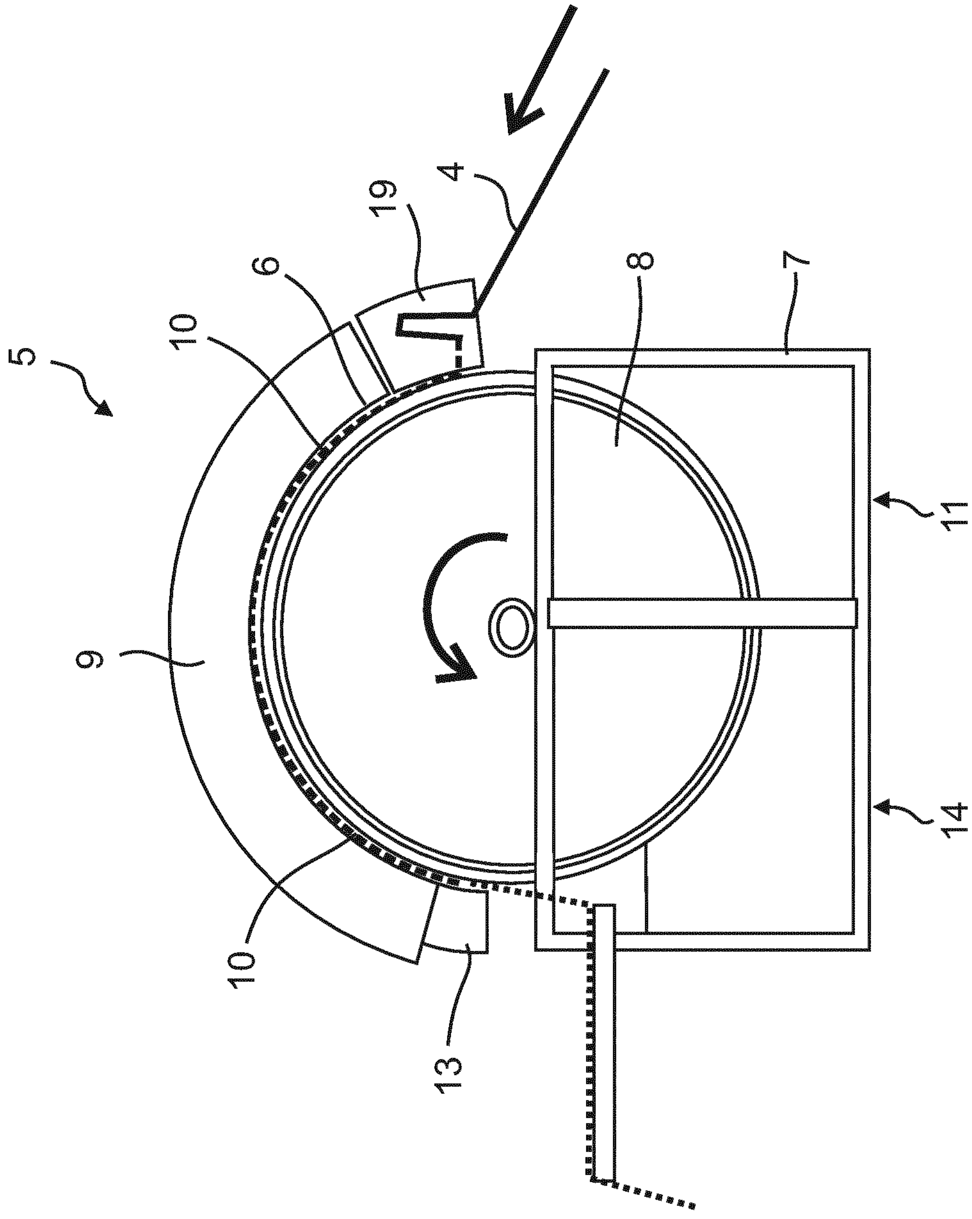
FIG. 2 a rolling arrangement of a paper processing device in schematic lateral view.

The paper processing device 1 according to FIG. 1 further comprises a rolling arrangement 5, which is illustrated in more detail in FIG. 2. A paper web section 6 of the paper web is formed to a paper body with the rolling arrangement 5, wherein the paper body has substantially a cylindrical cross-section.

Between the paper supply receiving device 3 and the rolling arrangement 5, a web tensioning control device is provided, by which the web tension is controlled. In addition, a lateral edge controlling device is provided, with which the paper web 4 is able to be conveyed in a controlled manner with regard to the position and direction of one or both lateral edges of the paper web 4.

The paper processing device 1 according to FIG. 1 further comprises a high speed paper web conveying arrangement. Through the interaction of the stations, paper supply receiving device 3, web tensioning control device and lateral edge control, such a wide (more than 350 mm) paper web 4 is able to be successfully conveyed very quickly and precisely to the rolling arrangement 5. Thus, on the one hand, owing to the high conveying speed per unit of time, a large quantity of paper can be rolled, i.e., formed to a paper body. On the other hand, several paper sticks can be formed, by cutting to size, from the comparatively wide paper body per rolling- or forming process. As a result, the paper processing device 1 described herein operates quickly and, in so doing, produces more paper products than would be feasible according to the prior art.

So that a paper web section 6 in the rolling arrangement 5 can be formed to a paper body, the paper web 4, originating from the paper supply 2, must be firstly cut to a desired length. This takes place in the high speed paper web conveying arrangement, where a perforation is formed in the paper web 4 by means of perforating blades, and where a paper web section 6 is separated from the paper web 4 by means of a crosscutting roller where the perforation was formed.

So that in the rolling arrangement 5 a paper web section 6 can be formed to a paper body, the paper web 4 originating from the paper supply 2 must firstly be acted upon with a fold. This takes place in the paper web conveying- and folding device 19. The paper web conveying- and folding device 19 comprises five conveying rolls, wherein a conveying roll is formed as a profiled folding roll, which folds or creases the paper web section 6. The folding roll lies against a counter-roll, which is coated, and which has a conical cross-section with up to 2 mm conicity. The conicity is preferably less than approximately 1 mm and/or more than approximately 0.5 mm, for example approximately 0.7 mm.

The rolling arrangement 5 according to FIG. 2 comprises a rolling drum 8, arranged rotatably on a carrier 7. A statically fastened cover 9, i.e., not movable during the rolling operation, is arranged above the rolling drum 8. A rolling space 10 is formed between cover 9 and rolling drum 8. The rolling space 10 has different dimensions over the circumference of the roller 8. The paper web section 6, which is cut to length and is provided with fold in the folding device 19, arrives into the rolling space 10 and is rolled up there to form a paper body which is very compact and almost cylindrical in cross-section.

For fixing the edge of the paper web section 6 on the circumference of the shaped paper body, the paper which is to be processed is acted upon by an additive which is formed from water. This takes place in the additive adding device 11, which wets the lower region 12 of the rolling drum 8 with additive, i.e., substantially opposite the cover 9 on the underside of the rolling arrangement 5, by means of a rotor application system, so that in the further process the paper body is also acted upon with the additive. In this respect the paper is wetted indirectly, namely by the rolling drum being wetted.

Following thereon, the paper body arrives into a cutting arrangement 13, where the paper body is cut to size so that one or more paper sticks are formed therefrom. Provision can be made that the paper body is firstly cut at the ends (end cut-off), and then the body (cut at the end side) is cut up into several parts (body cutting), wherein these cut parts form the paper sticks. The devices for the end cutting-off and for the body cutting can be separated spatially from one another in the cutting arrangement 13 or respectively in the paper processing device 1, and/or able to be controlled/regulated separately. Provision can also be made that the end cutting and the body cutting take place in a combined process step with accordingly configured cutting device 13.

The end pieces are disposed of; for this a sorting- and/or screen device can be provided, which sorts out the short end pieces and further conveys the (longer) paper sticks. Preferably, the ends are separated by the cutting device 13, wherein they fall as paper residues or waste into the disposal device 14 which is arranged substantially under the rolling arrangement 5.

A further station of the paper processing device 1 according to FIG. 1 forms the sorting device 15, which is formed in a multi-stage manner. The paper sticks are aligned there and deposited in at least one sorting box 16, wherein the paper sticks are arranged tightly in the sorting box 16 with as little intermediate space as possible, and parallel, i.e., without directional errors. This is essential for a quick and efficient further processing. The sorting device 15 comprises at least one vibration stimulation, by which a trough and/or the sorting box 16 is/are set into mechanical oscillation.

A further station of the paper processing device 1 forms a drying device 17. It comprises a spiral conveyor, i.e., a conveying trough arranged in a helical manner, with a gradient. The spiral conveyor is able to be acted upon with warm or hot air by means of a blower device, so that the paper sticks which are conveyed in the spiral conveyor are dried, for instance for the residue-free removal of the (water) additive.

A further station of the paper processing device concerns a post-treatment drum 18, in which the paper sticks can be fed to a post-treatment. A post-treatment can comprise a coating or a hardening or a quality control. The post-treatment drum 18 has a hexagonal cross-section and rotates with adaptable speed.

The paper processing device 1 according to FIG. 1 is able to be set and adjusted with regard to several technical functions. This concerns the paper web speed, the cutting device(s), the rolling process, disposal measures, sorting- and conveying measures and the providing of the paper sticks for the further processing. Temperatures can be set/varied, for instance during drying or during post-treatment, the additive quantity and additive composition and the additive temperature can be set/varied, the vibration stimulation of the sorting device 15 is able to be changed with regard to frequency and amplitude, and many more. At least one control- and regulating circuit can be provided for the coordinated adjustment of these paper processing parameters of the paper processing device 1.

FIG. 1 also represents one or more paper processing methods in which individual or multiple paper processing steps are carried out. A paper processing step concerns the providing of a paper web by means of a paper supply. A further processing step concerns the positionally- and directionally accurate conveying and/or cutting to length of the paper web. A further method step concerns the arranging of a fold or of a creased region on a paper web section. A further method step concerns the shaping of a paper web section with a rolling arrangement. A further method step concerns the adding of an additive, in particular with regard to a fixing of the paper web edge on the circumference of the (almost) cylindrical paper body. A further method step concerns the trimming of the shaped paper body, so that paper sticks with desired dimensions are formed. A further method step concerns the disposal of cutting residues or respectively paper waste. A further method step concerns the sorting and/or post-treatment of manufactured paper sticks.

With the paper processing device 1 and/or with the paper processing method, accuracies or respectively tolerances are produced, which with respect to the nominal length of a paper stick are approximately 1/10 mm and with respect to the nominal diameter of the stick are approximately 1/100 mm. Within a manufacturing process, in which large quantities of paper sticks of particular nominal length and of particular nominal diameter are manufactured, the values named herein for deviations/tolerances are less due to the process stages and device components which are precisely coordinated to one another.

LIST OF REFERENCE NUMBERS

1 paper processing device
2 paper supply, paper roll
3 paper supply receiving device
4 paper web
5 rolling arrangement
6 paper web section
7 carrier
8 rolling drum
9 cover
10 rolling space
11 additive adding device
12 lower region
13 cutting arrangement
14 disposal device
15 sorting device
16 sorting box
17 drying device
18 post-treatment drum
19 paper web conveying- and folding device

The invention claimed is:

1. A paper processing device comprising:

a) a paper roll that is unrollable to form a paper web;

b) a paper supply receiving device;

c) a web cutting arrangement said web cutting device is configured to receive said paper web from said paper supply receiving device; said web cutting arrangement is configured to form perforations in said paper web and then separate sections of said paper web at said perforations;

d) a rolling arrangement; said rolling arrangement is configured to receive cut sections of said paper web and to form rolled sections of said paper web; said rolling arrangement includes a rotatable rolling drum and a cover; said cover is positioned over at least a portion of said rolling drum; said cover is non-rotatable relative to said rolling drum; a rolling space is formed between said rolling drum and said cover; a size of said rolling space is non-constant between said rolling drum and said cover along an outer circumference of said rolling drum; a surface of said rotatable rolling drum that is facing said cover and/or a surface of said cover that is facing said rotatable rolling drum includes a plastic and/or textile coating;

e) a folding device that is positioned between said paper supply device and said rolling arrangement; said folding device is configured to form a fold or crease in each of said separate sections of said paper web prior to said separated sections of said paper web entering said rolling arrangement so that said folded sections of said paper web are fed into said rolling arrangement; said folding device includes first and second conveying rollers and a folding roller; said folding roller and one or both of said first and second conveying rollers have a conical cross-sectional shape; said folding roller and one or both of said first and second conveying roller are in mechanical contact with one another; said folding roller is positioned adjacent to or between said first and second conveying rollers;

f) a web tensioning control device that is positioned between said paper supply device and said rolling arrangement; said web tensioning control device is configured to control a web tension of said paper web as said paper web is fed to said rolling arrangement or said folding device; and g) a wetting device; said wetting device is configured to add a liquid additive to said rolling drum of said rolling arrangement so that said liquid additive is applied to said paper web as said paper web is rolled in said rolling arrangement said additive is or includes water; said wetting device is configured to add said additive to said rolling drum at a location prior to said paper web engaging said rolling drum.

2. The paper processing device as defined in claim 1, wherein said conical cross-sectional shape folding roller has a change in diameter of up to 2 mm along a longitudinal length of said folding roller.

3. The paper processing device as defined in claim 2, wherein at least one of said first conveying roller, said second conveying roller and said folding roller includes a coating that includes a plastic or textile material.

4. The paper processing device as defined in claim 3, wherein said rotatable rolling drum has a diameter of 700-1500 mm.

5. The paper processing device as defined in claim 4, wherein both said rotatable rolling drum and said cover includes a coating that includes a plastic or textile material.

6. The paper processing device as defined in claim 5, wherein said wetting device adds said liquid additive to said rolling drum prior to said paper web first contacting said rotatable rolling drum such that when said paper web first contacts said rotatable rolling drum said liquid additive is on an outer surface of said rotatable rolling drum.

7. The paper processing device as defined in claim 6, wherein said liquid additive is water.

8. The paper processing device as defined in claim 7, further includes a post roll cutting arrangement; said post roll cutting arrangement cutting a rolled paper web after said cut section of said paper web has been rolled in said rolling arrangement.

9. The paper processing device as defined in claim 8, further includes a disposal device that is configured to receive paper web residue from said post roll cutting arrangement; said disposal device at least partially positioned under said post roll cutting arrangement.

10. The paper processing device as defined in claim 9, further includes a multi-stage sorting device that is configured to sort said rolled sections of said paper web from said rolling arrangement; said multi-stage sorting device includes a trough conveyor and plurality of troughs; said plurality of troughs are configured to be osculated and/or vibrated to a) separate paper waste from said rolled sections of said paper web rolled sections of said paper web and/or b) orient a plurality of said paper web rolled sections with respect to one another.

11. The paper processing device as defined in claim 10, further includes a drying device; said drying device is configured to dry said paper web rolled sections of said paper web; said drying device includes a spiral conveyor and a blower device that blow warmed ambient air as said paper web rolled sections of said paper web move within said drying device via said spiral conveyor.

12. The paper processing device as defined in claim 11, further includes a post-treatment device; said post-treatment device includes a rotatable drum that has a polygonal cross-sectional shape; said paper web rolled sections of said paper web are subjected to a coating and/or hardener in said post-treatment device.

13. The paper processing device as defined in claim 1, wherein at least one of said first conveying roller, said second conveying roller and said folding roller includes a coating that includes a plastic or textile material.

14. The paper processing device as defined in claim 1, wherein said rotatable rolling drum has a diameter of 700-1500 mm.

15. The paper processing device as defined in claim 1, wherein both said rotatable rolling drum and said cover includes a coating that includes a plastic or textile material.

16. The paper processing device as defined in claim 1, wherein said wetting device adds said liquid additive to said rolling drum prior to said paper web first contacting said rotatable rolling drum such that when said paper web first contacts said rotatable rolling drum said liquid additive is on an outer surface of said rotatable rolling drum.

17. The paper processing device as defined in claim 1, further includes a post roll cutting arrangement; said post roll cutting arrangement cutting a rolled paper web after said cut section of said paper web has been rolled in said rolling arrangement.

18. The paper processing device as defined in claim 17, further includes a disposal device that is configured to receive paper web residue from said post roll cutting arrangement; said disposal device at least partially positioned under said post roll cutting arrangement.

19. The paper processing device as defined in claim 1, wherein said liquid additive is water.

20. The paper processing device as defined in claim 1, further includes a multi-stage sorting device that is configured to sort said rolled sections of said paper web from said rolling arrangement; said multi-stage sorting device includes a trough conveyor and plurality of troughs; said plurality of troughs are configured to be osculated and/or vibrated to a) separate paper waste from said rolled sections of said paper web rolled sections of said paper web and/or b) orient a plurality of said paper web rolled sections with respect to one another.

21. The paper processing device as defined in claim 1, further includes a drying device; said drying device is configured to dry said paper web rolled sections of said paper web; said drying device includes a spiral conveyor and a blower device that blow warmed ambient air as said paper web rolled sections of said paper web move within said drying device via said spiral conveyor.

22. The paper processing device as defined in claim 1, further includes a post-treatment device; said post-treatment device includes a rotatable drum that has a polygonal cross-sectional shape; said paper web rolled sections of said paper web are subjected to a coating and/or hardener in said post-treatment device.

23. A paper processing device comprising:

a) a paper roll; said paper roll is unrollable to form a paper web from said paper roll;

b) a paper supply receiving device; said paper supply device is configured to receive said paper roll;

c) a web cutting arrangement; said web cutting arrangement is configured to receive said paper web from said paper roll on said paper supply receiving device as said paper web is unrolled from said paper roll; said web cutting arrangement is configured to form perforations in said paper web and then separate sections of said paper web at said perforations to form paper web sections;

d) a folding device that is positioned after said web cutting arrangement; said folding device is configured to form a fold or crease in each of said paper web sections to form folded paper web sections; said folding device includes first and second conveying rollers and a folding roller; said folding roller and one or both of said first and second conveying rollers have a conical cross-sectional shape; said folding roller is positioned adjacent to or between said first and second conveying rollers;

e) a rolling arrangement; said rolling arrangement is configured to receive each of said folded paper web sections and to form a rolled paper stick from each of said folded paper web sections; said rolling arrangement includes a rotatable rolling drum and a cover; said cover is positioned over at least a portion of said rotatable rolling drum and is positioned statically relative to said rotatable rolling drum during formation of each of said rolled paper sticks; a rolling space is formed between said rolling drum and said cover; a size of said rolling space is non-constant between said rolling drum and said cover along a portion of an outer circumference of said rolling drum; a surface of said rotatable rolling drum that is facing said cover and/or a surface of said cover that is facing said rotatable rolling drum includes a plastic and/or textile coating;

f) a wetting device; said wetting device is configured to add a liquid additive to said rolling drum of said rolling arrangement so that said liquid additive contacts each of said folded paper web sections that contact said rolling arrangement; said liquid additive is or includes water; said wetting device is configured to add said liquid additive to said rolling drum at a location prior to said paper web engaging said rolling drum;

g) a stick cutting arrangement; said stick cutting arrangement is configured to receive each of said rolled paper sticks from said rolling arrangement and to i) cut off end portions of each end of said rolled paper stick to form a rolled stick body, and ii) cut said rolled stick body to form a plurality of cut rolled paper stick sections; and h) a sorting device; said sorting device is configured to separate said cut off end portions of each end of said rolled paper stick from said plurality of cut rolled paper stick sections.

24. The paper processing device as defined in claim 23, wherein said conical cross-sectional shape folding roller has a change in diameter of up to 2 mm along a longitudinal length of said folding roller.

25. The paper processing device as defined in claim 24, wherein said sorting device includes a trough conveyor and plurality of troughs; said plurality of troughs are configured to be osculated and/or vibrated to both a) separate said cut off end portions of each end of said rolled paper stick from said plurality of cut rolled paper stick sections and b) orient said plurality of cut rolled paper stick sections with respect to one another.

26. The paper processing device as defined in claim 25, further includes a drying device; said drying device is configured to dry said plurality of cut rolled paper stick sections; said drying device includes a spiral conveyor and a blower device that blows warmed ambient air as said plurality of cut rolled paper stick sections move upwardly within said drying device via said spiral conveyor; a ratio of a height of said drying device to a conveying diameter of said drying device is at least 2:1.

27. The paper processing device as defined in claim 26, further includes a post-treatment device that is configured to apply a coating material on an outer surface of said plurality of cut rolled paper stick sections; said post-treatment device includes a rotatable open end drum that has a polygonal cross-sectional shape; said plurality of cut rolled paper stick sections are exposed to a coating and/or hardener in said rotatable open end drum of said post-treatment device.

28. The paper processing device as defined in claim 23, wherein said sorting device includes a trough conveyor and plurality of troughs; said plurality of troughs are configured to be osculated and/or vibrated to both a) separate said cut off end portions of each end of said rolled paper stick from said plurality of cut rolled paper stick sections and b) orient said plurality of cut rolled paper stick sections with respect to one another.

29. The paper processing device as defined in claim 23, further includes a drying device; said drying device is configured to dry said plurality of cut rolled paper stick sections; said drying device includes a spiral conveyor and a blower device that blows warmed ambient air as said plurality of cut rolled paper stick sections move upwardly within said drying device via said spiral conveyor; a ratio of a height of said drying device to a conveying diameter of said drying device is at least 2:1.

30. The paper processing device as defined in claim 23, further includes a post-treatment device that is configured to apply a coating material on an outer surface of said plurality of cut rolled paper stick sections; said post-treatment device includes a rotatable open end drum that has a polygonal cross-sectional shape; said plurality of cut rolled paper stick sections are exposed to a coating and/or hardener in said rotatable open end drum of said post-treatment device.

31. The paper processing device as defined in claim 23, wherein said paper web of said paper supply has a width of 350 mm to 750 mm.

32. A method for forming a plurality of rolled paper stick sections comprising:

a) providing a paper roll;

b) providing a paper supply receiving device; said paper supply device is configured to receive said paper roll;

c) unrolling said paper roll that is on said paper supply receiving device to form a paper web from said paper roll;

d) tensioning said paper web that is supplied from said paper roll;

e) providing a web cutting arrangement; said web cutting arrangement includes a cutting device that is configured to form perforations in said paper web; said web cutting arrangement is configured to separate sections of said paper web at said perforations in said paper web to form paper web sections;

f) supplying said paper web to said web cutting arrangement so that said web cutting arrangement can form said perforations in said paper web and then subsequently separate sections of said paper web at said perforations in said paper web to form said paper web sections;

g) controlling a position of edges of said paper web to properly position said paper web as said paper web is suppled to said web cutting device;

h) providing a folding device that is positioned after said web cutting arrangement; said folding device is configured to form a fold or crease in each of said paper web sections that are supplied to said folding device so as to form folded paper web sections; said folding device includes first and second conveying rollers and a folding roller; said folding roller and one or both of said first and second conveying rollers have a conical cross-sectional shape; said folding roller is positioned adjacent to or between said first and second conveying rollers;

i) suppling said paper web sections to said folding device to cause each of said paper web sections to move through said first and second conveying rollers and said folding roller to cause each of said paper web sections to be folded to form folded web sections;

j) providing a rolling arrangement; said rolling arrangement is configured to receive each of said folded paper web sections and to form a rolled paper stick from each of said folded paper web sections; said rolling arrangement includes a rotatable rolling drum and a cover; said cover is positioned over at least a portion of said rotatable rolling drum and is positioned statically relative to said rotatable rolling drum during formation of each of said rolled paper sticks; a rolling space is formed between said rolling drum and said cover; a size of said rolling space is non-constant between said rolling drum and said cover along a portion of an outer circumference of said rolling drum;

k) suppling each of said folded paper web sections to said rolling arrangement to form said rolled paper stick;

l) providing a wetting device; said wetting device is configured to add a liquid additive to said rolling drum of said rolling arrangement so that said liquid additive contacts each of said folded paper web sections that contact said rolling arrangement; said liquid additive is or includes water;

m) causing said wetting device to apply said liquid additive to said rolling drum at a location prior to said paper web engaging said rolling drum such that said folded paper web sections that contact said rolling drum also contact said liquid additive on said rolling drum;

n) providing a stick cutting arrangement; said stick cutting arrangement is configured to receive each of said rolled paper sticks from said rolling arrangement and to cut each of said rolled paper sticks o) causing said stick cutting arrangement to i) cut off end portions of each end of said rolled paper stick that is formed in said rolling arrangement to form a rolled stick body, and ii) cut said rolled stick body to form a plurality of cut rolled paper stick sections;

p) providing a sorting device; said sorting device is configured to separate said cut off end portions of each end of said rolled paper stick from said plurality of cut rolled paper stick sections; and q) supply said cut rolled paper stick sections and said cut off end portions to said sorting device so that said sorting device can separate said cut off end portions of each end of said rolled paper stick from said plurality of cut rolled paper stick sections.

33. The method as defined in claim 32, wherein said conical cross-sectional shape folding roller has a change in diameter of up to 2 mm along a longitudinal length of said folding roller.

34. The method as defined in claim 33, wherein said sorting device includes a trough conveyor and plurality of troughs; said plurality of troughs are configured to be osculated and/or vibrated; and further including the step of osculating and/or vibrating said plurality of troughs to both a) separate said cut off end portions of each end of said rolled paper stick from said plurality of cut rolled paper stick sections and b) orient said plurality of cut rolled paper stick sections with respect to one another.

35. The method as defined in claim 34, further including the step of a) supplying a drying device; said drying device is configured to dry said plurality of cut rolled paper stick sections; said drying device includes a spiral conveyor and a blower device that blows warmed ambient air as said plurality of cut rolled paper stick sections move upwardly within said drying device via said spiral conveyor; a ratio of a height of said drying device to a conveying diameter of said drying device is at least 2:1, and b) suppling said plurality of cut rolled paper stick sections to said drying device such that said rolled paper stick sections are conveyed upwardly by said spiral conveyor while said blower device blows said air on said rolled paper stick sections to dry said rolled paper stick sections.

36. The method as defined in claim 35, further includes the steps of a) providing a post-treatment device that is configured to apply a coating material on an outer surface of said plurality of cut rolled paper stick sections; said post-treatment device includes a rotatable open end drum that has a polygonal cross-sectional shape; said plurality of cut rolled paper stick sections are exposed to a coating and/or hardener in said rotatable open end drum of said post-treatment device, and b) suppling said plurality of cut rolled paper stick sections that have been dried to said post-treatment device so as to apply a coating and/or hardener to an outer surface of said cut rolled paper stick sections while said cut rolled paper stick sections are rotated in said open end drum that has a polygonal cross-sectional shape.

37. The method as defined in claim 32, wherein said sorting device includes a trough conveyor and plurality of troughs; said plurality of troughs are configured to be osculated and/or vibrated; and further including the step of osculating and/or vibrating said plurality of troughs to both a) separate said cut off end portions of each end of said rolled paper stick from said plurality of cut rolled paper stick sections and b) orient said plurality of cut rolled paper stick sections with respect to one another.

38. The method as defined in claim 32, further including the step of a) supplying a drying device; said drying device is configured to dry said plurality of cut rolled paper stick sections; said drying device includes a spiral conveyor and a blower device that blows warmed ambient air as said plurality of cut rolled paper stick sections move upwardly within said drying device via said spiral conveyor; a ratio of a height of said drying device to a conveying diameter of said drying device is at least 2:1, and b) suppling said plurality of cut rolled paper stick sections to said drying device such that said rolled paper stick sections are conveyed upwardly by said spiral conveyor while said blower device blows said air on said rolled paper stick sections to dry said rolled paper stick sections.

39. The method as defined in claim 32, further includes the steps of a) providing a post-treatment device that is configured to apply a coating material on an outer surface of said plurality of cut rolled paper stick sections; said post-treatment device includes a rotatable open end drum that has a polygonal cross-sectional shape; said plurality of cut rolled paper stick sections are exposed to a coating and/or hardener in said rotatable open end drum of said post-treatment device, and b) suppling said plurality of cut rolled paper stick sections that have been dried to said post-treatment device so as to apply a coating and/or hardener to an outer surface of said cut rolled paper stick sections while said cut rolled paper stick sections are rotated in said open end drum that has a polygonal cross-sectional shape.

* * * * *